Patented Mar. 7, 1950

2,499,811

UNITED STATES PATENT OFFICE 2,499,811

POLYMERIZATION OF ALPHA-HALO-ACRYLIC COMPOUNDS

Carl E. Barnes, Belvidere, N. J., and William O. Ney, Jr., Easton, Pa., assignors to General Aniline & Film Corporation, New York, N. Y., a corporation of Delaware No Drawing. Application July 26, 1945, Serial No. 607,270

5 Claims. (Cl. 260—87.5)

The present invention relates to the production of monomeric α-halogen substituted acrylic compounds which are capable of yielding colorless polymers and to the colorless polymers obtained from such compounds. More particularly, the invention relates to the preparation of esters of α-haloacrylic acids, and especially methyl α-chloracrylate, which are capable of forming colorless polymers and to the color-free polymers obtained therefrom.

In our application Serial No. 601,342, filed June 23, 1945, it is pointed out that the cause of color formation in resins obtained by polymerizing α-halogen substituted acrylic compounds has been found by us to be due to the presence of oxalyl halide compounds, such as, for example, methyl oxalyl chloride in the case of methyl α-chloracrylate monomer. It is proposed in that application to incorporate into the α-haloacrylic monomer any substance which itself does not introduce color and which converts the oxalyl halide compound into a non-color-forming compound, thereby resulting in a monomer capable of forming a colorless polymer.

Among the types of compounds found suitable for this purpose there are mentioned in the application esters of alcohols with inorganic acids, partial esters of polyhydric alcohols with polymerizable unsaturated acids, esters of organic hydroxy acids, and monohydric alcohols in which the hydroxyl group is attached to a hydrocarbon radical. As specific examples of the types of compounds are mentioned: dipropyl sulfite, ethyl sulfate, glycol sulfate, glycol sulfite, ethylene chlorohydrin; diethylene glycol maleate, ethylene glycol monoacrylate, ethylene glycol monomethacrylate; vinyl, isopropenyl, methyl, ethyl and β-hydroxy ethyl esters of hydracrylic and glycollic acids; methyl, ethyl, propyl, isopropyl, n-butyl, t-butyl, amyl, cyclohexyl, allyl, benzyl, and other monohydric alcohols.

According to the present invention, colorless polymers of esters of α-haloacrylic acids are obtained by incorporating certain of the aforementioned types of compounds, particularly a polyhydric alcohol or the partial esters and ethers of polyhydric alcohols, in the reaction mixture from which the α-haloacrylic ester is prepared and then polymerizing the monomer resulting from the reaction under the conditions hereinafter described.

In U. S. Patent 2,345,126, granted to Pollack, there is disclosed the use of polyhydric alcohols, and partial esters and ethers thereof to inhibit coloration in α-haloacrylate polymers. According to this patent, these compounds are added to the monomer which has first been treated with reducing or oxidizing agents and then distilled. Although coloration in the polymer is said to be suppressed, a substantial amount of yellow coloration still remains in the polymer.

The addition may, in general, be made to any reaction which results in an α-haloacrylate monomer. We prefer, however, to incorporate the aforesaid substances in those processes where the monomer is prepared by dehydrohalogenating α,α-α,β-dihalopropionates or their mixtures as, for example, in the dehydrohalogenation reaction described in application Serial No. 601,347, filed June 23, 1945, now U. S. Patent No. 2,476,528, wherein α,α- and α,β-dihalopropionates are dehydrohalogenated by use of an aqueous solution of a salt of a carboxylic acid, such as, for example, sodium or potassium acetate. According to our invention, we incorporate into the dehydrohalogenating mixture, a polyhydric alcohol or the partial ester or ether thereof. The amount of the compound thus added is relatively small being from about 0.1 to about 6%, the preferred amount being approximately 5% based on the weight of the dihalopropionate.

In practice, the dehydrohalogenation is carried out by refluxing the mixture containing the dihalopropionate, the salt, and polyhydric alcohol. When the reaction is completed, the resulting mixture after neutralization is distilled under reduced pressure to recover the α-chloracrylate monomer. During the dehydrohalogenation reaction it is desirable to have present polymerization inhibitors, such as, for example, hydroquinone, sulfur, or phenylene diamine, to prevent polymerization of the α-haloacrylates formed.

It is a surprising result of our invention that when the polyhydric alcohols, or their ethers and esters, are incorporated in the reaction mixture from which the α-haloacrylate is produced and the latter polymerized, a completely color-free polymer can be obtained, whereas when the same compounds are incorporated in the already formed monomer, complete suppression of color is not obtained as is pointed out in U. S. Patent 2,345,126. We believe that the polyhydric alcohol compounds are able under the dehydrohalogenation conditions to react in situ with any oxalyl halide that may be formed while the dehydrohalogenation reaction proceeds to completion, converting it into a non-color-forming compound. As a result, the monomer which is obtained is free from any oxalyl halide and will polymerize to a color-free polymer depending on the following conditions.

If the oxalyl halide converting substance incorporated in the dehydrohalogenation mixture has a vapor pressure such that some of it distills over with the monomer when the latter is being distilled from the reacted mixture, then the monomer may be polymerized without rigorous exclusion of air, provided that the amount distilled over with the monomer is sufficient to react with any oxalyl halide that may be formed subsequent to the formation of the monomer, and during polymerization. Thus, for example, glycol will distill over with the monomer in sufficient amount to take care of any oxalyl halide that might form. Also, the lower monohydric alcohols, such as methyl, ethyl, and propyl alcohols will do so. However, because of their greater volatility, much of the alcohol may be lost during the dehydrohalogenation reaction or distill off before any of the α-haloacrylate.

On the other hand, where the oxalyl halide converting substance has a high boiling point, such as some of the high boiling polyhydric alcohols, like glycerine, diethylene glycol, and triethylene glycol, so that little, if any, of the polyhydric alcohol boils over with the α-haloacrylate when it is distilled, there may be none or insufficient of the alcohol present in the monomer to react with any oxalyl halide that may be formed in the subsequent handling and polymerization of the monomer. In this case, we may proceed in the following manner to prepare a color-free polymer.

In accordance with the latter procedure, we add any of the oxalyl halide converting compounds mentioned in application Serial No. 601,342, filed June 23, 1945, to the distilled monomer in an amount sufficient to react with any oxalyl halide that may be formed in the subsequent handling of the monomer and during polymerization. Thus, we may add any one of the monohydric alcohols, such as methyl, ethyl, or propyl alcohol to the distilled monomer, or an ester of an inorganic acid, such as ethyl sulfate, dipropyl sulfite, glycol sulfate, or ethylene chlorohydrin. Partial esters of polyhydric alcohols with polymerizable unsaturated acids as, for example, diethylene glycol maleate and ethylene glycol monoacrylate are also suitable for this purpose as are esters of organic hydroxyacids, such as, for example, vinyl, isopropenyl, methyl, ethyl, and β-hydroxyethyl esters of hydracrylic and glycollic acids.

This method has the advantage of permitting accurate control of the amount of oxalyl halide converting substance incorporated in the monomer. The amount added to the monomer will depend on the amount of air with which the oxalyl halide-free monomer obtained by the dehydrohalogenation procedure subsequently comes in contact. If the distilled monomer is placed in a polymerization vessel leaving a free air space of a certain volume, the amount of any particular oxalyl halide converting compound required to be added to the monomer to prevent coloration will always be the same. In a similar manner, the amount of compound that need be added to the monomer can be determined on the basis of the amount of air with which the monomer may come in contact, contact with greater amounts of air requiring the addition of larger amounts of oxalyl halide converting compounds.

This method also permits use of smaller amounts of oxalyl halide converting compounds, since any oxalyl halide formed during the dehydrohalogenation reaction is taken care of by the high boiling substance added thereto. Thus, only a small amount need be added to the distilled monomer. As a result, plasticizing and lowering of the softening point of the monomer is avoided where methyl alcohol, for example, if added in large amounts would have a plasticizing action on the polymer. When practicing this method, we prefer to add one of the monohydric alcohols, such as, for example, methyl alcohol to the distilled monomer. As pointed out above, the amount added will depend on the amount of air with which the monomer may come in contact. The addition of 3% of methyl alcohol will, for example, be sufficient to permit carrying out the polymerization without color formation in vessels unsealed from the air and in which no special effort is made to exclude air during polymerization.

The following examples are illustrative of our invention, the parts being by weight.

*Example 1*

Into a reaction vessel equipped with a reflux condenser and a stirrer are charged 8000 parts of water,
4000 parts of sodium acetate,
5000 parts of methyl α,β-dichloropropionate,
  250 parts of glycol, and
  80 parts of hydroquinone as a polymerization inhibitor.

The mixture is refluxed for 3 hours while stirring and then cooled, the reacted mixture separated into two layers. The lower layer containing the methyl α-chloracrylate and the glycol was drawn off, treated with a 3% sodium carbonate solution to neutralize any acid formed during the dehydrohalogenation reaction, and then dried by filtering through an anhydrous sodium sulfate filter bed. The filtrate was distilled under reduced pressure, and methyl α-chloracrylate was recovered at 40° C.–41° C. at a pressure of about 15 mm. of mercury.

The methyl α-chloracrylate was introduced in a glass tube containing approximately .01% of benzoyl peroxide as a polymerization catalyst. The tube was stoppered and the monomer polymerized after heating at 60° C. for about 12 hours to form a colorless transparent solid. The mass was heated at 120° C. for an additional six hours and the tube then broken to remove the polymer, which was a hard, transparent solid free from color. No color developed in the mass even after exposure for long periods of time to air, light, and ultraviolet rays or heat.

*Example 2*

A mixture of 157 parts of methyl α,β-dichloropropionate,
120 parts of sodium acetate,
  4 parts of glycerine,
240 parts of water, and
  3 parts of hydroquinone were refluxed for about 2 hours. The resulting mixture was neutralized with a 3% sodium bicarbonate solution and then dried over sodium sulfate. It was distilled under vacuum to recover methyl α-chloracrylate. To the monomer thus obtained was added about 1% of methyl alcohol. The mixture was then poured through air into a glass vessel containing about .01% of benzoyl peroxide and the vessel was then stoppered. Polymerization was carried out by heating at 35° C. for 24 hours, followed by 12 hours heating at 65° C. and a final heating at 115° C. for 24 hours. A hard, clear, and completely colorless resin was obtained.

While the process has been illustrated in connection with dehydrohalogenation procedures utilizing sodium acetate, it may be utilized with salts of other carboxylic acids, such as potassium acetate, alkali, and alkaline earth metal salts of tartaric, lactic, citric, benzoic, salicylic, naphthalic, malonic, and maleic acids, for example, such as the ammonium, sodium, potassium, magnesium, calcium, strontium, and barium salts of these acids. When the salt of a carboxylic acid is utilized, the salt may be used in a molecular ratio ranging from 1:1 to 2:1 or more of salt to the dihalopropionate. It is preferred to use the salt of the carboxylic acid in excess.

In place of aqueous solutions of salts of carboxylic acids in the dehydrohalogenation mixture, we may use aqueous solutions of alkaline agents, such as sodium or potassium hydroxides, carbonates or bicarbonates. However, because of the tendency of these alkalis to cause saponification of the esters and the rigorous control of conditions attending their use, we prefer to use the salts of carboxylic acids.

The dehydrohalogenation reaction may be carried out at any suitable temperature ranging from room temperature or lower, if desired, to 150° C. or more. Where higher temperatures are used, the reaction may be carried out under pressure in suitable pressure vessels. We prefer to carry out the reaction under reflux temperatures.

The polyhydric alcohols and their partial esters and ethers have been found particularly advantageous for incorporation into the dehydrohalogenating mixture for the purposes of our invention. Because of their general low vapor pressures, little of these reagents are lost during the dehydrohalogenating reaction. By selecting those having the proper vapor pressure, the amount distilled over with the monomer can be carefully controlled. Those can be selected which substantially do not distill over in any appreciable amount with the monomer. In this case, the amount of monohydric alcohol added to the monomer can be controlled depending on its subsequent contact with air.

Among suitable polyhydric alcohols and their partial ethers and esters other than those mentioned in the examples which may be added to the dehydrohalogenation mixture may be mentioned diethylene glycol, trimethylene glycol, glycol monoacetate, monoacetin, diacetin, ethylene glycol monoethyl ether, and glycol monomethyl ether.

It is to be understood that the invention is equally applicable in the dehydrohalogenation of other esters of $\alpha,\alpha$- and $\alpha,\beta$-dihalopropionates and the polymerization of the corresponding $\alpha$-haloacrylates obtained thereby. As examples of other esters which may be dehydrohalogenated in the presence of small amounts of the oxalyl halide converting compounds and whose corresponding $\alpha$-haloacrylates resulting therefrom are polymerized to colorless polymers may be mentioned the ethyl, propyl, butyl, amyl, isoamyl, n-hexyl, cyclohexyl, allyl, benzyl, and furfuryl esters of $\alpha,\alpha$- or $\alpha,\beta$-dichloropropionic acids.

The invention is applicable to all possible types of polymerization methods as referred to, for example, in our copending application Serial No. 601,342, filed June 23, 1945.

Since it is obvious that the invention may be varied without departing from the spirit thereof, it is to be understood that it is not limited to the specific embodiments above set forth but only in accordance with the scope of the appended claims.

We claim:

1. An improved process for preparing a color-free, color-stable polymer of an $\alpha$-haloacrylic acid ester, which comprises dehydrohalogenating in solution the corresponding ester of a dihalopropionic acid containing at least 1 halogen atom in the $\alpha$-position, in the presence of from 0.1 to 6% of a polyhydric alcohol compound selected from the group consisting of normally liquid polyhydric alcohols containing not more than three hydroxyl groups, their partial esters and partial ethers; distilling the monomeric $\alpha$-haloacrylic acid ester from the dehydrohalogenation mixture, while maintaining in solution in the distillate, from the time it is collected until its polymerization is accomplished, a small concentration, not essentially exceeding 3%, of an alcohol containing not more than two hydroxyl groups, whereby accumulation of oxalyl halide compounds formed upon exposure of the $\alpha$-haloacrylic acid ester to air is prevented; and polymerizing said distillate in the presence of said alcohol contained therein.

2. An improved process for preparing a color-free, color-stable polymer of an $\alpha$-haloacrylic acid ester, which comprises dehydrohalogenating in solution the corresponding ester of a dihalopropionic acid contained at least 1 halogen atom in the $\alpha$-position, in the presence of from 0.1 to 6% of a polyhydric alcohol compound selected from the group consisting of normally liquid polyhydric alcohols containing not more than three hydroxyl groups, their partial esters and partial ethers; distilling the monomeric $\alpha$-haloacrylic acid ester from the dehydrohalogenation mixture, said polyhydric alcohol compound having a vapor pressure such that substantially none distills over with the $\alpha$-haloacrylic acid ester; adding to the distillate a monohydric alcohol in an amount not exceeding 3% of the weight of the ester distillate, and maintaining a small concentration of said alcohol in solution in said distillate, from the time it is collected until its polymerization is accomplished, whereby accumulation of oxalyl halide compounds formed upon exposure of the $\alpha$-haloacrylic acid ester to air is prevented; and polymerizing said distillate in the presence of said monohydric alcohol.

3. An improved process for preparing a color-free, color-stable polymer of an $\alpha$-haloacrylic acid ester, which comprises dehydrohalogenating in solution the corresponding ester of a dihalopropionic acid containing at least 1 halogen atom in the $\alpha$-position, in the presence of from 0.1 to 6% of a polyhydric alcohol compound selected from the group consisting of normally liquid polyhydric alcohols containing not more than two hydroxyl groups, their partial esters and partial ethers; distilling the monomeric $\alpha$-haloacrylic acid ester from the dehydrohalogenation mixture, said polyhydric alcohol compound being volatile with the $\alpha$-haloacrylic ester distillate; and polymerizing said distillate in the presence of the co-distilled polyhydric alcohol compound contained therein, whereby accumulation of oxalyl halide compounds formed upon exposure of the $\alpha$-haloacrylic acid ester to air is prevented.

4. A process for preparing a color-free, color-stable polymer of methyl α-chloracrylate, which comprises dehydrochlorinating methyl α,β-dichloropropionate in the presence of an aqueous solution of sodium acetate and from 0.1 to 6% of glycol, based on the weight of methyl α,β-dichloropropionate; distilling methyl α-chloracrylate from the dehydrochlorination mixture, whereby a portion of the glycol is co-distilled with and is retained in the ester distillate; and polymerizing the methyl α-chloracrylate in the presence of said glycol contained therein.

5. A process of preparing a color-free, color-stable polymer of methyl α-chloracrylate, which comprises dehydrochlorinating methyl α,β-dichloropropionate in the presence of an aqueous solution of sodium acetate and from 0.1 to 6% of glycerine, based on the weight of methyl α,β-dichloropropionate; distilling methyl α-chloracrylate from the dehydrochlorination mixture; incorporating an amount, not essentially exceeding 3%, of methyl alcohol in the methyl α-chloracrylate distillate upon collection thereof; and polymerizing the distillate in the presence of said alcohol.

CARL E. BARNES.
WILLIAM O. NEY, Jr.

REFERENCES CITED

The following references are of record in the file of this patent:

UNITED STATES PATENTS

| Number | Name | Date |
|---|---|---|
| 2,282,088 | Pollack | May 5, 1942 |